(12) United States Patent
Fleizach

(10) Patent No.: US 11,080,828 B1
(45) Date of Patent: Aug. 3, 2021

(54) WEIGHTED SUMMING OF COMPONENT CHIRAL IMAGES FOR IMPROVED CONTRAST ENHANCEMENT

(71) Applicant: United States of America as represented by the Secretary of the Navy, San Diego, CA (US)

(72) Inventor: Gregory Knowles Fleizach, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 43 days.

(21) Appl. No.: 16/738,871

(22) Filed: Jan. 9, 2020

(51) Int. Cl.
*G06T 5/00* (2006.01)
*G06T 5/50* (2006.01)

(52) U.S. Cl.
CPC ............... *G06T 5/007* (2013.01); *G06T 5/50* (2013.01)

(58) Field of Classification Search
CPC .............. A61B 6/027; G02F 1/133612; G09G 2310/024; G06T 5/007; G06T 5/50
See application file for complete search history.

(56) References Cited

U.S. PATENT DOCUMENTS

| | | | |
|---|---|---|---|
| 4,732,456 A | 3/1988 | Fergason | |
| 4,832,458 A | 5/1989 | Fergason | |
| 5,975,702 A | 11/1999 | Pugh, Jr. | |
| 6,817,309 B2 | 11/2004 | Horton | |
| 7,038,745 B2 | 5/2006 | Weber | |
| 7,518,097 B2 | 4/2009 | Ashley | |
| RE41,737 E * | 9/2010 | Leem | H04B 1/7083 370/335 |
| 2002/0036608 A1* | 3/2002 | Hirakata | H05B 41/2824 345/87 |
| 2004/0109586 A1* | 6/2004 | Samson | G01N 15/1468 382/109 |
| 2007/0057146 A1 | 3/2007 | Ashley | |
| 2007/0146574 A1* | 6/2007 | Giraudet | A42B 3/226 349/86 |

FOREIGN PATENT DOCUMENTS

WO    WO 2016033181    3/2016

OTHER PUBLICATIONS

Khorasaninejed et al. "Multispectral Chiral Imaging with a Metalens." Nano Letters. 2016.

* cited by examiner

*Primary Examiner* — Randolph I Chu
(74) *Attorney, Agent, or Firm* — Naval Information Warfare Center, Pacific; Kyle Eppele

(57) ABSTRACT

Method and system for improved contrast enhancement. The method includes receiving, from at least one imaging system, first and second component chiral images, the first component chiral image being captured by a first filter that is polarized in a first direction, the second component chiral image being captured by a second filter that is polarized in a second direction, the second direction being substantially orthogonal to the first direction. The method also includes pre-enhancing, by a processor, one or both of said first component chiral image and said second component chiral image. Then the processor weights and sums at least a portion of the first and second component chiral images. Weighting and summing may be repeated until an optimal weight is reached. A contrast enhanced image may be generated after the optimal weight is reached.

19 Claims, 4 Drawing Sheets

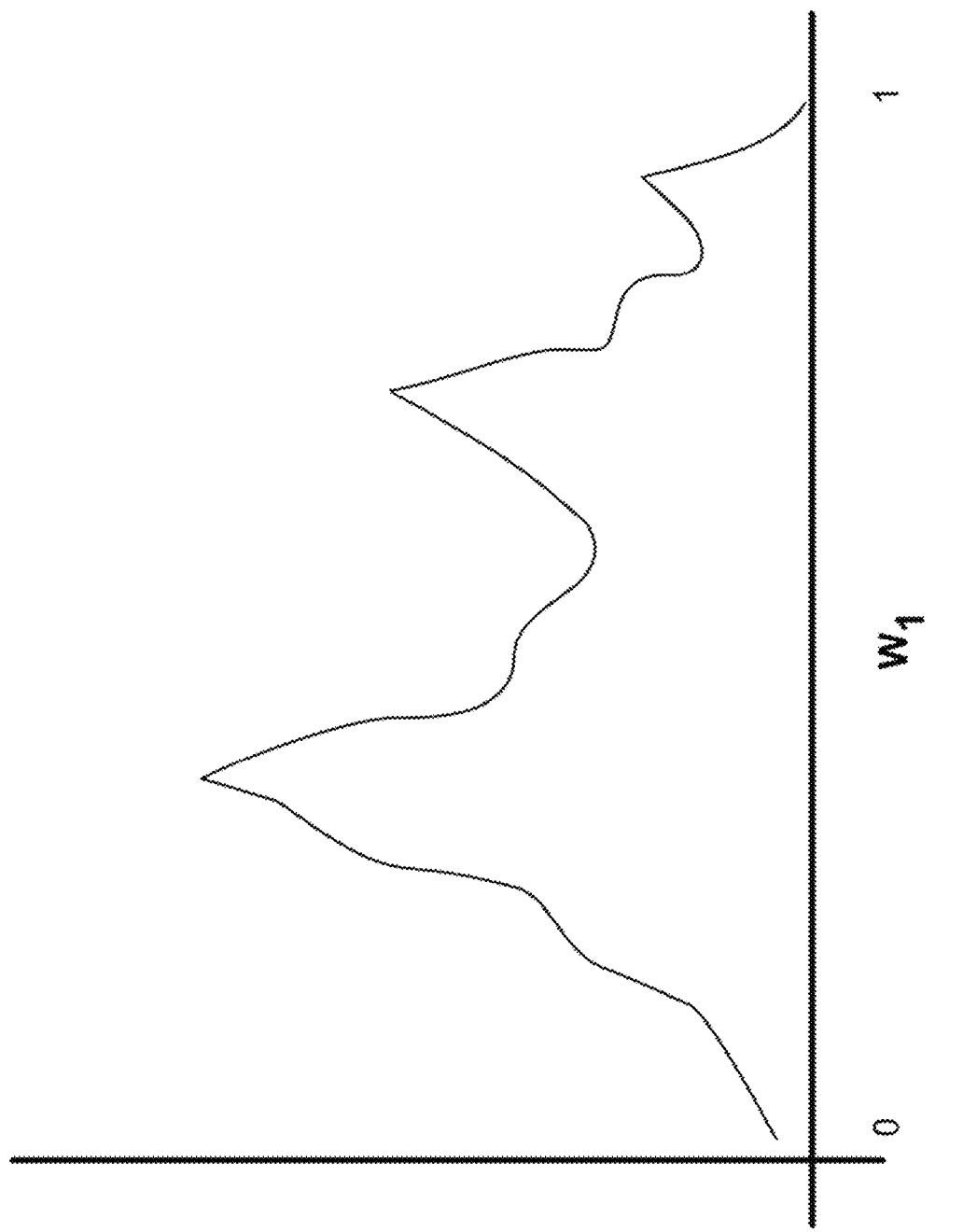

WEIGHTED SUMMING OF COMPONENT CHIRAL IMAGES FOR IMPROVED CONTRAST ENHANCEMENT

FEDERALLY-SPONSORED RESEARCH AND DEVELOPMENT

The United States Government has ownership rights in this invention. Licensing inquiries may be directed to Office of Research and Technical Applications, Naval Information Warfare Center, Pacific, Code 72120, San Diego, Calif., 92152; telephone (619) 553-5118; email: ssc_pac_t2@navy.mil. Reference Navy Case No. 104,624.

BACKGROUND OF THE INVENTION

Field of Invention

This disclosure relates generally to image processing and, more particularly, to contrast enhancement in image processing.

Description of Related Art

Images may be captured under circumstances that are not ideal. For example, due to time constraints, imagery can be captured with less-than-optimal aperture settings that result in the imagery being either too bright or too dark. The result is that the objects in the image (e.g., the objects of interest) cannot be seen with enough clarity to be useful. Other times, the image is captured with the best camera settings, but the scenario is low-light and, again, it is hard to make out interesting features. Lastly, it is possible that the target of interest is camouflaged to intentionally hide it. In this case, the target will be hard to discern with even the best camera settings.

Prior art solutions to these problems include contrast enhancement via image processing, which can come in many forms. For example, such contrast enhancement may be performed using global histogram equalization, histogram stretching, contrast limited adapted histogram equalization (CLAHE), contrast normalization, etc. Contrast enhancement is still an area of active research, however, because there is no single solution that works across all imagery. Some techniques work in some scenarios, but not in others. Even the algorithms that do improve the contrast tend to enhance the noise as well, which is undesirable. Furthermore, the best algorithms are often quite complex and can have many sensitive parameters that need to be tuned.

Standard contrast enhancement techniques such as those listed above process a single image to provide enhanced contrast. The image is collected and, either in real-time or after the fact, the image is processed to produce a contrast enhanced version of the image. Ideally, the contrast enhanced image shows details or features that were not visible in the original imagery. Often though, the standard contrast enhancement algorithms fail to provide the desired level of enhancement or they require significant manual intervention to do so.

There is a need for a system and method for improved contrast enhancement that do not suffer from the drawbacks of the prior art.

BRIEF SUMMARY OF INVENTION

The present disclosure addresses the needs noted above by providing a system and method for improved contrast enhancement. In accordance with one embodiment of the present disclosure, a method is provided for improved contrast enhancement. The method comprises: (a) receiving, from at least one imaging system, a first component chiral image, the first component chiral image being captured by a first filter that is polarized in a first direction; (b) receiving from the at least one imaging system a second component chiral image, the second component chiral image being captured by a second filter that is polarized in a second direction, the second direction being substantially orthogonal to the first direction; (c) pre-enhancing, by a processor, one or both of said first component chiral image and said second component chiral image; (d) weighting, by the processor, at least a portion of the first and second component chiral images, thus producing a weighted first component chiral image and a weighted second component chiral images; (e) summing, by the processor, the weighted first component chiral image and the weighted second component chiral images, (f) repeating steps (d) through (e) until an optimal weight is reached; and (g) generating a contrast enhanced image.

These, as well as other objects, features and benefits will now become clear from a review of the following detailed description, the illustrative embodiments, and the accompanying drawings.

BRIEF DESCRIPTION OF DRAWINGS

The accompanying drawings, which are incorporated in and form a part of the specification, illustrate example embodiments and, together with the description, serve to explain the principles of the system and method for improved contrast enhancement. In the drawings:

FIG. 4 is a graphical illustration of a contrast metric and weights in accordance with one embodiment of the present disclosure.

DETAILED DESCRIPTION

The present method and system provide improved contrast enhancement in images. The present method and system may be used to generate imagery that has improved contrast with limited processing. A first component chiral image may be captured using a first filter that is polarized in a first direction in front of one imaging system. A second component chiral image may be captured using a second filter that is polarized in a second direction, the second direction being orthogonal to the first, in front of another imaging system. The polarizations refer to the direction of oscillation of the electromagnetic wave of light. After the component chiral images are captured, each image can be pre-enhanced by, e. g., enhancing the image's sharpness or brightness, or reducing noise in the image. The next step determines the optimal weighting of each component chiral image before summing the two weighted images to generate the contrast enhanced result. The present system and method could be used to enhance not only visible imagery, but also, e.g., infrared imagery and synthetic aperture radar imagery.

For purposes of the present disclosure, contrast may be defined as the difference in brightness of items in the image. By increasing the contrast, light areas of an image may become lighter and dark areas may become darker. By increasing the contrast, the image may also appear to have more detail. The present system and method may enhance contrast in substantially real time.

As a general matter, the light received directly from the sun, and many types of light bulbs, is by nature unpolarized. However, the objects that we see are the result of light reflecting from those objects. Some objects, natural and/or manmade, alter the polarization of the light when the light reflects from them. For example, the *Chrysina gloriosa* species of beetle has definite left-hand chirality of its shell, as do other beetles and some crustaceans. Some plastics show interesting patterns when viewed with circularly polarized filters.

Circularly polarized filters for imagers are readily available. In fact, right- and left-hand polarizations are used in one popular method of displaying three dimensional (3D) movies.

Figure 1:
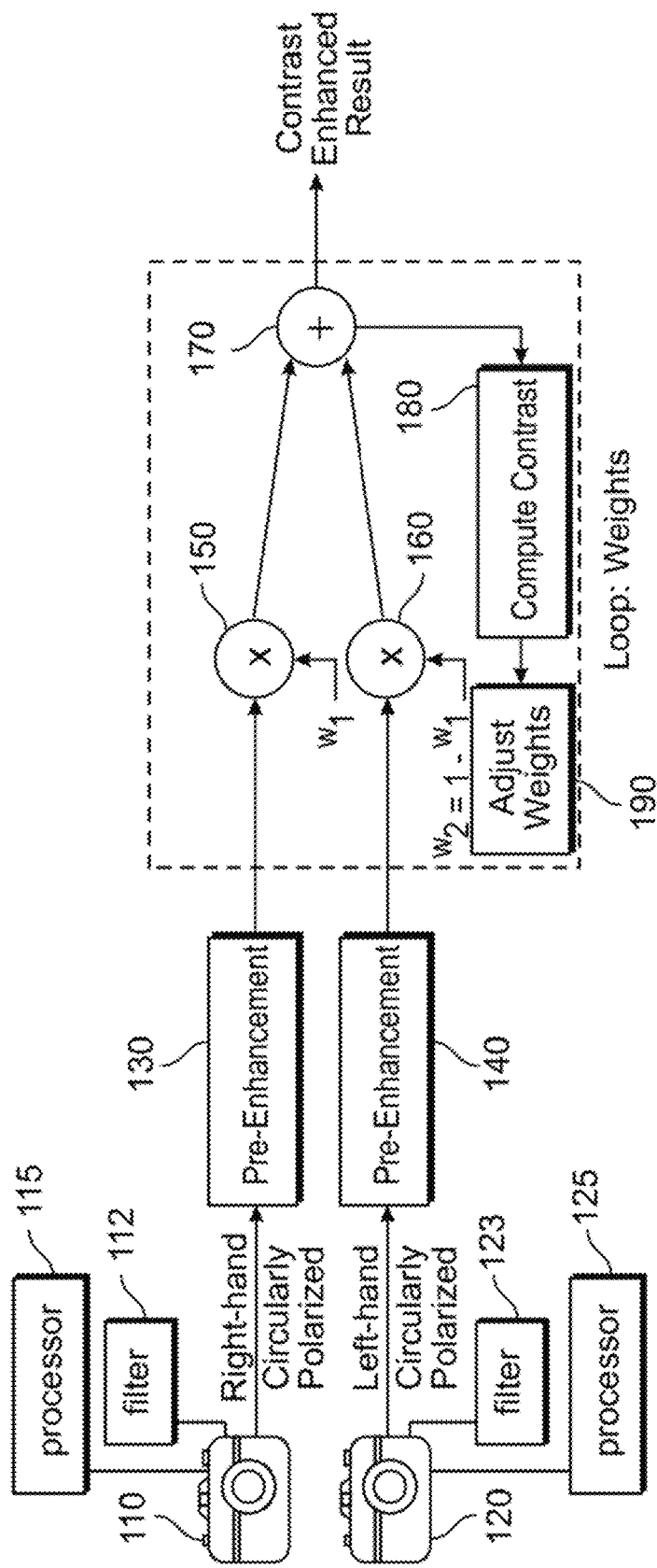
FIG. 1 illustrates block diagram for a method for improved contrast enhancement in accordance with one embodiment of the present disclosure.

FIG. 1 illustrates a block diagram of a method for improving contrast enhancement in accordance with one embodiment of the present disclosure. The system shown in FIG. 1 utilizes two imaging systems 110, 120 to capture the component chiral images: one imaging system for capturing right-hand circularly polarized images and another imaging system for capturing left-hand circularly polarized images. Each of the two imaging systems 110, 120 may be, for example, a phone camera, a digital camera, a video camera, an infrared camera, or a stereoscopic camera. In fact, many phones have dual cameras, so with a dual filter, the phones could be adapted for this use.

First imaging system 110 may be operatively coupled to first filter 112 and first processor 115. In the present example, first filter 112 is a right-hand circularly polarized filter. Similarly, second imaging system may be operatively coupled to second filter 123 and second processor 125. Second filter 123 is a left-hand circularly polarized filter.

It may be desirable for the polarization of the second filter 123 to be orthogonal to the polarization of the first filter 112, as in this example, since this configuration may promote enhanced contrast. Each of first processor 115 and second processor 125 may be at least one of a microprocessor, field programmable gate array (FGPA), graphics processing unit (GPU) or other processor deemed suitable to carry out the system and method, including being suitable to execute the necessary instructions.

Figure 2B:
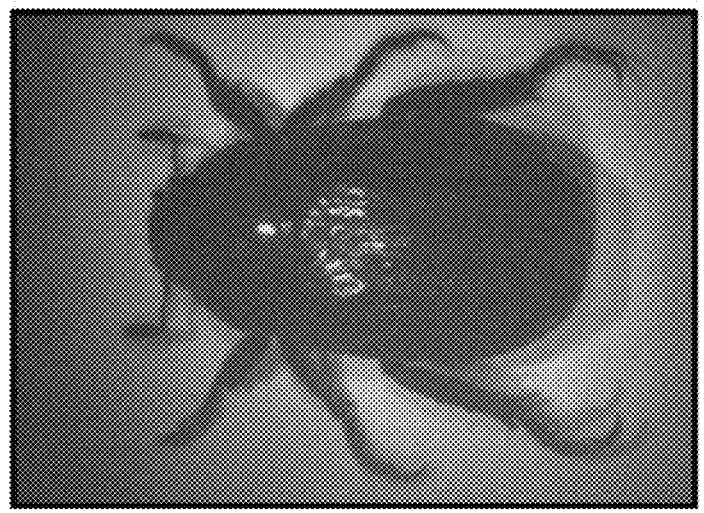
FIG. 2B is a right-hand circularly polarized image that can be processing using the system and method of the present disclosure.
Figure 2A:
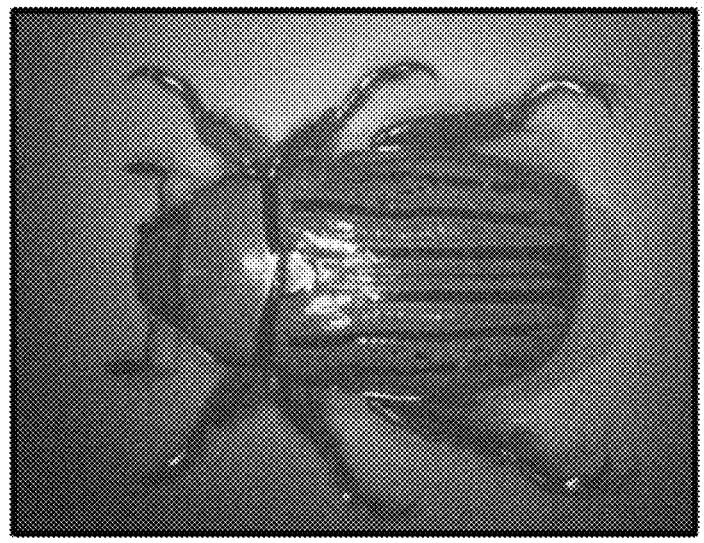
FIG. 2A is a left-hand circularly polarized image that can be processing using the system and method of the present disclosure.

First imaging system 110 may be co-located with second imaging system 120. First and second imaging systems 110, 120 may capture images by pointing in the same direction at the same time. Filters 112, 123 may be off-the-shelf hardware for photography. In the present example, filters 112, 123 are operatively coupled to imaging systems 110, 120 by any suitable means, including but not limited to, filter 112, 123 being screwed into the lenses of imaging systems 110, 120. As an alternative to the first imaging system 110 being co-located with the second imaging system 120, the converse may be true in that the first imaging system 110 and the second imaging system 120 may be in different locations.

Where two imaging systems are used to capture the different chiral images, the resulting component chiral images may need to be registered. Referring now to FIG. 2A, illustrated is a left-hand circularly polarized image, or first component chiral image, that may be processed using the system and method of the present disclosure. In FIG. 2A, a top view of a beetle is shown. The beetle has unusually light coloring juxtaposed with unusually dark coloring. The contrast in this image is off, but the contrast may be enhanced using the present system and method. FIG. 2B is a right-hand circularly polarized image, or right-hand circularly polarized image, that may be contrast-enhanced using the system and method of the present disclosure.

Through image registration, the first and second component chiral images (FIGS. 2A, 2B) may be aligned. If the first and second component chiral images are on a fixed system, however, registration is not necessary, although an initial calibration may be necessary.

It should be understood that, in lieu of the two imaging instruments 110, 120, one imaging instrument, e.g., imaging instrument 110, could be used, having both a first polarization filter and a second polarization filter to create, respectively, a first component chiral image and a second component chiral image.

The chiralities described above refer to left- and right-hand polarizations, but other orthogonal polarizations may be useful as well. For example, horizontal and vertical polarizations could be used as well in this system and method. The component chiral images may be color, monochrome, or panchromatic.

The description above focuses on still images, but the system and method could be used for video as well.

State-of-the-art lenses are capable of capturing the component chiral images using a single imager, but the method described herein is agnostic to the number of imagers used. Even if the images are captured using a single lens or camera, the component chiral images may be treated as separate images going forward.

After the images are captured, the first component chiral image and the second component chiral image, can be pre-enhanced at steps 130, 140, respectively. This could include, for example, histogram stretching to correct the brightness of the images. Other possible pre-enhancements include, but are not limited to, de-interlacing where the images were captured by an interlaced video system (e.g. NTSC) or denoising. Depending on the orientation of the imagers, registration between the two images might be necessary as well.

Pre-enhancement at steps 130, 140 may include edge detection that is done before summing the first and second component chiral images. Pre-enhancement may also include gamma correction, brightness correction or any other correction that you know about the image beforehand. Pre-enhancement may also include noise reduction for video and still imagery.

Following the pre-enhancement steps 130, 140, the first and second component chiral images are ready to be weighted and summed for optimal contrast enhancement. In lieu of weighting and summing the entire image, portions of the images may be weighted and summed and then stitched together to create a single contrast-enhanced image. Through weighting, the present system and method use the image that has the best components and weight that image more heavily. The system uses a metric, e.g., a contrast metric or a sharpness metric, to adjust the weights until the metric is optimized. When the chosen metric is optimized, the "best" components of each image have been selected. Examples of contrast metrics include Weber contrast, Michelson contrast, delta L* and root mean square contrast metrics. Examples of sharpness metrics include Laplacian, fast Fourier Transform (FFT), gradient, contrast and Q sharpness metrics.

By weighting the first and second component chiral images, the goal here is to find the weights ($w_1$ for component chiral image 1 and $w_2$ for component chiral image 2) by which to multiply each component chiral image, respectively (FIGS. 2A, 2B), before the two images are summed. Note that the weights are related by the equation $w_1+w_2=1$ because it is desired that the output image have the same approximate range of values as the input images (i.e. the overall image brightness should not change significantly). The weights chosen will be those that maximize the contrast in the resulting weighted and summed image.

At the weighting steps 150, 160, the weights are chosen for the first component chiral image (FIG. 2A) and the second component chiral image (FIG. 2B), respectively, by searching through the range of possible values to find those values that yield the output image with the highest contrast. The image with the highest contrast may be deemed as the image where the chosen contrast metric is maximized, and thus the image contrast is maximized. One approach to weighting at steps 150, 160 is to choose a pair of weights and multiply the component chiral images by their respective weights.

Then, at step 170, the system sums the weighted images into a temporary output image. At step 180, the system computes the contrast of the temporary output image. In one embodiment, several possible weights are iterated over to find the pair that provides the highest contrast metric.

Iterations to determine the optimal contrast may occur in small steps or large steps. For a contrast enhancement that must occur in substantially real time, the system may start with coarse, large steps and then decrease the size of the steps. This may occur, for example, through a feedback loop that actively adjusts weight based on a metric, e.g., a contrast metric or a sharpness metric. For example, when working with right- and left-circularly polarized images, prior art methods include subtracting one from the other. For example, the two images with different polarizations would be subtracted from each other to highlight the differences between them. However, subtraction increases the noise. Weighted summing is a way of making noise less of a factor.

In another embodiment, the change in the computed contrast metric from one pair of weights to another can be used to automatically direct the weights towards an optimal value. It is also possible to let a user control the weights through a slider bar, for example. In this case, the user might not choose the pair of weights that produce the output image with the highest contrast metric, but rather the output image that has the most contrast subjectively.

After the system generates the temporary output image, it computes contrast again at step 180, and then adjusts the weights at step 190 until an optimal weight is determined. The sum of the weight $w_1$ and the weight $w_2$ should total one (1.0). Once the weights are adjusted at step 190, then the system again weights the images at steps 150, 160, sums them at step 170 where it outputs a temporary output image. Then, the system computes contrast at 180 and adjusts the weights until the optimal weight is reached for each image. The iterations stop when a change to the weights does not cause an increase (above a certain tolerance) in the determined metric that is being tracked, e.g., the contrast metric or sharpness metric. There may be numerous different possibilities for each weight.

Weighted summing may be applied to sub-images (i.e., tiles of the original image) to yield the best contrast on a per sub-image basis. The sub-images may then need to be re-stitched together to avoid boundaries between them.

At step 180, the calculation to measure contrast of the temporary output image can be any of the commonly used methods that accurately captures the image contrast. Alternatively, a sharpness metric might be used instead of, or in conjunction with, a contrast metric to determine the pair of weights that produces the best output image. The point is that this step provides a value that is proportional to the quality of the output image in terms of contrast and/or sharpness.

Once the optimal weights have been determined for each component chiral image, the resulting contrast enhanced image is formed by summing the two weighted images. The component chiral images will be weighted such that the result provides the highest contrast. For example, it may be the case that the right-hand circularly polarized image is weighted by 0.2 (indicating this image is lower contrast) and the left-hand circularly polarized image is weighted by 0.8 (indicating this image is higher contrast). In another example, the right-hand circularly polarized image is weighted by 1.0 and the left-hand circularly polarized image is weighted by 0. Therefore, the left hand circularly polarized image would have no weight and would thus be essentially inconsequential for the weighting calculation. For a video application, the weights might be used for a certain number of frames before recalculating, or they may be recalculated every frame depending on the pipeline.

Processing in accordance with the present system and method is intuitively and computationally simple. In addition, it may be desirable to minimize processing time so that the contrast may be enhanced in substantially real time. As shown in the block diagram of FIG. 1, the steps of the method may be performed in parallel with each other. For example, pre-enhancement of the right-hand circularly polarized image at step 130 may be performed at substantially the same time as pre-enhancement of the right-hand circularly polarized image at step 140. Likewise, by way of example, weighting of the pre-enhanced right hand circularly polarized image at step 150 may be performed in parallel with weighting of the pre-enhanced left hand circularly polarized image at step 160.

The present system and method include automatically combining weighted component chiral images to create a single contrast enhanced image. The present system and method can provide superior imagery to a single polarization system because optimizing the weights of the component chiral images leverages an additional facet of information.

The present system and method may create a single contrast-enhanced image from two images with different chiralities. The contrast-enhanced image may include previously-light areas that become lighter and previously-dark areas that become darker. By increasing the contrast, the image may also appear to have more detail. The present system and method may enhance contrast in substantially real time.

The present system and method do not require the subtraction of one component chiral image from the other. Thus, any increase in noise caused by subtraction is obviated. In the prior art, multiple polarization images were used, but only the differences between the polarizations were used to indicate differences between the polarizations. One of the problems is that subtracting noisy images increases noise more than summing noisy images.

The component chiral images do not have to be pre-enhanced prior to the weighted summing. The method for automatically choosing the weights of the component chiral images is just one example. Other methods are possible. The weights could also be chosen manually with user intervention. The algorithm to compute the contrast can be one of many in popular use.

There may be methods for choosing the weights that are more efficient than the brute force search described above. These would not change the results, but would improve the processing speed.

The summing of the images at step 170 can be performed directly or the transparency (alpha channel) of the images can be manipulated to show features of both component chiral images. The resolution of the weights (i.e. the step size of the weights) used in the search is variable depending upon the application.

Figure 3:
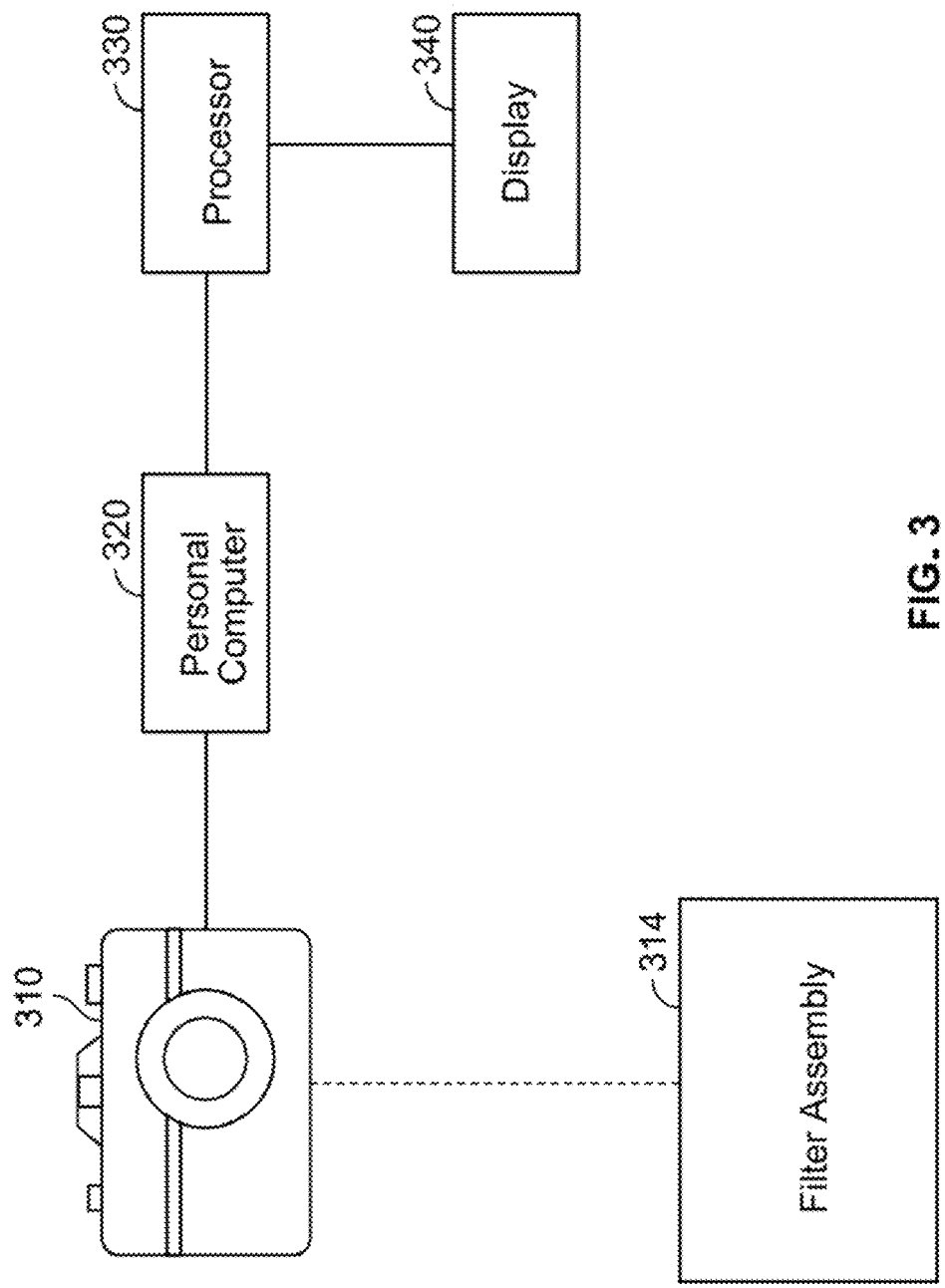
FIG. 3 is a system for improved contrast enhancement in accordance with one embodiment of the present disclosure.

FIG. 3 is a system for improved contrast enhancement in images in accordance with one embodiment of the present disclosure. The system 300 may include an imaging system 310, a filter assembly 314 operatively coupled to the imaging system, a personal computer 320 that is operably coupled to the imaging system 310, a processor 330 that is operably coupled to the imaging system 310 and a display 340 that is operably coupled to the imaging system 310. The imaging system 310 could be any digital imaging system. Digital imaging system 310 can connect to filter assembly 314 and personal computer 320. The first component chiral image and the second component chiral image may be fed from the imaging system 310 that uses the filter assembly 314 to the personal computer 320. The personal computer 320, which may include its own memory and processor, may feed the image to another processor 330 such as a graphics processing unit, field programmable gate array.

As an alternative to the system of FIG. 3, the personal computer 320 may be removed and the imaging system 310 and processor 330 can be connected immediately adjacent to each other. Some processing that was done by the personal computer 320 may be off-loaded to the imaging system 310 (which may include a processor) and/or the processor 330 shown in FIG. 3.

Software (not shown in FIG. 3) may be resident in the memory of personal computer 320, which may cause the processor 330 to perform one or more steps of the method for weighted summing of component chiral images for improved contrast enhancement as set forth herein. If mechanical/electrical devices (whether existing as part of the imaging system or added thereafter) are used to further aid in in this process, such devices may be located within the body of imaging system 310 or elsewhere as can be appreciated by one of ordinary skill in the art.

The processor 330 may be configured to receive, at a memory device, the first and second component chiral images from an imaging system. The processor 330 may also be configured to perform the steps of the present system and method, including the steps described in FIG. 1, which include but are not limited to, (a) receiving, from at least one imaging system, a first component chiral image, the first component chiral image being captured by a first filter that is polarized in a first direction; (b) receiving from the at least one imaging system a second component chiral image, the second component chiral image being captured by a second filter that is polarized in a second direction, the second direction being substantially orthogonal to the first direction; (c) pre-enhancing, by a processor, one or both of said first component chiral image and said second component chiral image; (d) weighting, by the processor, the first and second component chiral images, thus producing a weighted first component chiral image and a weighted second component chiral images; (e) summing, by the processor, the weighted first component chiral image and the weighted second component chiral images; (f) repeating steps (d) through (e) until an optimal weight is reached; and (g) generating a contrast enhanced image.

Memory 320, as noted hereinabove, is sufficient to hold at least the first component chiral image and the second component chiral image. Memory 320 may also include other elements such as processing steps or instructions related to improved contrast enhancement. Examples of such processing steps are described in the flow chart of FIG. 1.

The speed of the processor 330 needed may depend on the application in which the processor 330 is used, as can be appreciated by one of ordinary skill in the art.

The present system and method are intuitively and computationally simple. The present system and method include automatically combining weighted component chiral images to create a single contrast-enhanced image.

The present system and method can provide superior imagery to a single polarization system because optimizing the weights of the component chiral images leverages an additional facet of information.

The present system and method provide the ability to create a single contrast-enhanced image from two images with different chiralities.

Other previous systems and methods combine images captured with different polarizations to improve the imagery, but the polarizations were not necessarily chiral (i.e. right- and left-hand polarized). Additionally, the previous systems and methods utilized the difference between the two polarized images by subtracting one from the other. This is non-optimal because differencing causes increased noise.

The present system and method do not require the subtraction of one component chiral image from the other. Therefore, the increase in noise caused by subtraction is obviated.

The component chiral images do not have to be pre-enhanced prior to the weighted summing.

The method for automatically choosing the weights of the component chiral images is just one example. Other methods are possible. The weights could also be chosen manually with user intervention. The algorithm to compute the contrast can be one of many in popular use.

There may be methods for choosing the weights that are more efficient than the brute force search described above. These would not change the results, but would improve the processing speed.

The summing of the images can be performed directly or the transparency (alpha channel) of the images can be manipulated to show features of both component chiral images. The chiralities described above refer to left- and right-hand polarizations, but other orthogonal polarizations may be useful as well. For example, horizontal and vertical polarizations could be used as well with the present system and method.

Referring now to FIG. 4, illustrated is an example of a contrast metric versus weight in accordance with one embodiment of the present disclosure. The first peak could correspond to a feature that is prominent in the second image, but not the first image so when w1 is rather low and w2 is rather high, the overall contrast of the summed images peaks. When w1 is increased, there may be a feature in the first image that is highlighted, but at the expense of the feature in the second image. The summed image using this new set of weights does not produce an overall contrast metric value greater than the previous peak.

For a brute force search, a step size of 0.01 may occur between [0,1] for w1 (w2=1−w1). For coarse/fine search:

step size of 0.1 between [0,1] for w1 and then step size of 0.01 between w1_max−0.1<w1<w1_max+0.1 (this would be faster for real-time image processing, but it may lead to a local maximum instead of a global maximum).

The foregoing description of various embodiments has been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the method and system be defined by the claims appended hereto.

What is claimed as new and desired to be protected by Letters Patent of the United States is:

1. A method, comprising:
   (a) receiving, from at least one imaging system, a first component chiral image, the first component chiral image being captured by a first filter that is polarized in a first direction;
   (b) receiving from the at least one imaging system a second component chiral image, the second component chiral image being captured by a second filter that is polarized in a second direction, the second direction being substantially orthogonal to the first direction;
   (c) pre-enhancing, by a processor, one or both of said first component chiral image and said second component chiral image;
   (d) weighting, by the processor, at least a portion of the first and second component chiral images, thus producing a weighted first component chiral image and a weighted second component chiral images;
   (e) summing, by the processor, the weighted first component chiral image and the weighted second component chiral images,
   (f) repeating steps (d) through (e) until an optimal weight is reached; and
   (g) generating a contrast enhanced image.

2. The method of claim 1, wherein the first component chiral image is received from a first imaging system and the second component chiral image is received from a second imaging system.

3. The method of claim 1, wherein the first and second component chiral images are color, monochrome, or panchromatic.

4. The method of claim 1, wherein the optimal weight is determined to be met when a contrast metric has been reached.

5. The method of claim 1, wherein the optimal weight is determined to be met when a sharpness metric has been reached.

6. The method of claim 1, wherein the weighting step includes:
   selecting, by the processor, the weights for the first component chiral image and the second component chiral image based on a contrast metric.

7. The method of claim 1, wherein the weighting is applied to the entire image.

8. A system, comprising:
   a first component chiral image created with a filter that is polarized in a first direction;
   a second component chiral image created with a second filter that is polarized in a second direction, the second direction being substantially orthogonal to the first direction;
   a processor configured to:
      pre-enhance one or both of said first component chiral image and said second component chiral image;
      weight at least a portion of the first and second component chiral images, thus producing a weighted first component chiral image and a weighted second component chiral images; and
      sum the weighted first component chiral image and the weighted second component chiral images,
      repeat the summing and weighting until an optimal weight is reached; and
      generate a contrast enhanced image.

9. The system of claim 8, wherein the first component chiral image is received from a first imaging system and the second component chiral image is received from a second imaging system.

10. The system of claim 8, wherein the first and second component chiral images are color, monochrome, or panchromatic.

11. The system of claim 8, wherein the optimal weight is determined to be met when a contrast metric has been reached.

12. The system of claim 8, wherein the optimal weight is determined to be met when a sharpness metric has been reached.

13. The system of claim 8, wherein the processor is further configured to:
   select the weights for the first component chiral image and the second component chiral image based on a contrast metric.

14. The system of claim 8, wherein the weighting is applied to the entire image.

15. A system, comprising:
   a first imaging system;
   a first filter operatively coupled to the first imaging system, wherein the first imaging system and the first filter are configured to create a first component chiral image;
   a second imaging system;
   a second filter operatively coupled to the second imaging system, wherein the second imaging system and the second filter are configured to create a second component chiral image, wherein the second filter is polarized in a second direction, the second direction being substantially orthogonal to the first direction;
   a processor configured to:
      pre-enhance one or both of said first component chiral image and said second component chiral image;
      weight at least a portion of the first and second component chiral images, thus producing a weighted first component chiral image and a weighted second component chiral images; and
      sum the weighted first component chiral image and the weighted second component chiral images,
      repeat the summing and weighting until an optimal weight is reached; and
      generate a contrast enhanced image.

16. The system of claim 15, wherein the first and second component chiral images are color, monochrome, or panchromatic.

17. The system of claim 15, wherein the optimal weight is determined to be met when a contrast metric has been reached.

18. The system of claim 15, wherein the optimal weight is determined to be met when a sharpness metric has been reached.

19. The system of claim 8, wherein the processor is further configured to:
- select the weights for the first component chiral image and the second component chiral image based on a contrast metric.

* * * * *